(«United States Patent [19]

Katis

[11] Patent Number: 4,730,411
[45] Date of Patent: Mar. 15, 1988

[54] COLLAPSIBLE MARINE TRAP

[76] Inventor: Peter Katis, 218 Fulton St., Medford, Mass. 02155

[21] Appl. No.: 854,182

[22] Filed: Apr. 21, 1986

[51] Int. Cl.$^4$ ............................................. A01K 69/10
[52] U.S. Cl. ....................................................... 43/105
[58] Field of Search .................. 43/100, 102, 103, 105

[56] References Cited

U.S. PATENT DOCUMENTS

| 1,193,816 | 8/1916 | Ottmann | 43/105 |
| 1,407,714 | 2/1922 | Saravig . | |
| 1,407,744 | 2/1922 | Ftyklo | 43/105 |
| 1,958,724 | 5/1934 | Stanislaw | 43/100 |
| 1,985,177 | 12/1934 | Lawrence | 43/100 |
| 2,716,304 | 8/1955 | Taylor | 43/100 |
| 2,760,297 | 8/1956 | Buyken | 43/105 |
| 4,354,325 | 10/1982 | Aho | 43/105 |

FOREIGN PATENT DOCUMENTS

| 573887 | 2/1924 | France | 43/100 |
| 578745 | 3/1924 | France | 43/100 |
| 1350573 | 3/1963 | France | 43/100 |

Primary Examiner—Nicholas P. Godici
Assistant Examiner—G. M. Reid
Attorney, Agent, or Firm—Edward A. Gordon

[57] ABSTRACT

A collapsible trap is disclosed characterized by a net member and a folding frame member, the frame being disposed within the net member and adapted to be erected to form an enclosure therewith. The net member has an entrance including an opening to permit water creatures to enter the trap and to hinder leaving the trap. The folding frame member disposed within the net member comprises first and second annular members attached to the net member in spaced parallel relationship. A plurality of folding longitudinal members join the first and second annular members together. Each of the longitudinal members comprises a pair of arms having disatal and proximal ends. The distal ends of the arms are pivotally attached to annular members. The proximal ends of each of the arms of the longitudinal members are pivotally joined together to thereby permit the longitudinal members to be folded inwardly of the net to collapse the trap and unfolded outwardly to erect the trap with a limiting member limiting the outward movement of the longitudinal members beyond the erected position.

10 Claims, 9 Drawing Figures

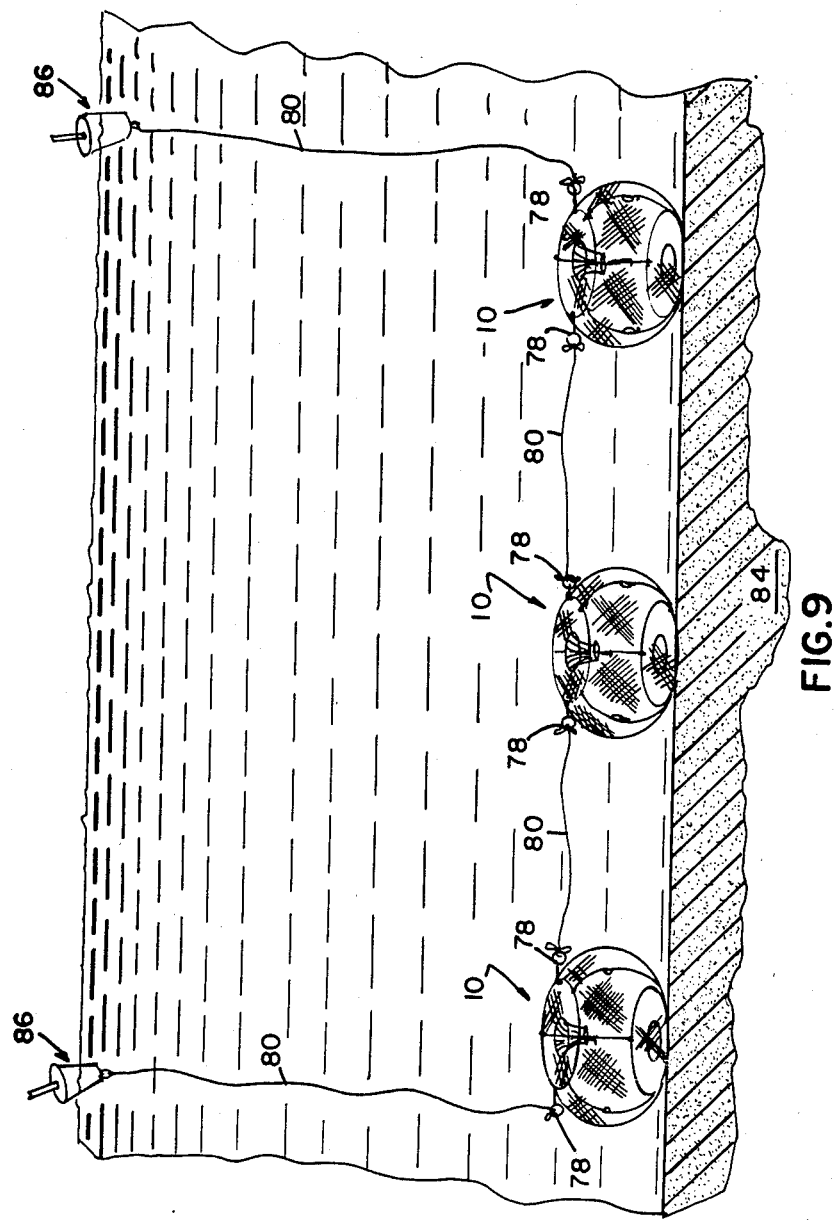

COLLAPSIBLE MARINE TRAP

FIELD OF THE INVENTION

The invention relates to marine traps and more particularly to a collapsible, portable trap for trapping both fresh and salt water creatures such as crabs, lobsters, relatively small fish, etc.

BACKGROUND OF THE INVENTION

Salt and fresh water creature traps, hereinafter, for simplicity, together referred to as marine creature traps, have been used for a long time. Early traps, for example, were formed of a rigid space frame structure having enclosing walls of net or grid-like material with an opening therein which permitted a creature to enter the trap and to hinder the creature from leaving the trap. While such traps have been satisfactory in many applications, such rigid traps become a storage and transportation problem especially when used by an individual having limited space or when used in large quantities on a commercial fishing vessel. Additionally such prior art traps because of their configuration and/or weight are difficult if not impossible to use in commercial operations where large quantities of the traps are strung together to facilitate deployment and recovery of the traps.

To reduce the storage and transportation problems of rigid traps, various folding or collapsible traps have been devised. Examples of such prior art collapsible traps are disclosed in the following U.S. Patents: U.S. Pat. No. 1,407,744 to Ftyklo; U.S. Pat. No. 1,958,724 to Slanislaw; U.S. Pat. No. 1,985,177 to Lawrence and U.S. Pat. No. 2,716,304 to Taylor. Additionally U.S. Pat. No. 4,354,325 to Aho discloses a folding trap having a folding frame fitted within a net resembling a bag, the net having an opening which permits creatures to enter the trap and hinders them from leaving the trap. Frame members are hinged together adjacent mid positions thereof to permit swinging between folded and erected positions. Resilient extension links extend between frame members and are strained when the frame is folded so as to tend to erect the trap. A releasable retainer retains the trap in folded position against force from extension means, and a limiter limits swinging of the frame members in erected positions.

While the above referred to collapsible traps have disclosed various improvements in collapsible traps, it has become desirable to provide an improved collapsible marine trap having a simple, uncomplicated structure which minimizes weight and components and which is easily erected and collapsed manually without the need of complicated, expensive and time consuming devices.

Accordingly a desirable object of the present invention is to provide an improved collapsible marine trap.

A still further desirable object of the present invention is to provide a collapsible marine trap which is easy to deploy and recover in large quantities.

A further desirable object of the present invention is to provide an improved marine trap which is designed in a novel manner whereby it may be easily collapsed into a substantially flat mode when desired for storage or transportation and easily erected to the use mode.

A still further desirable object of the present invention is to provide a collapsible trap characterized by a net and a folding frame disposed within and attached to the net, the net having an entrance including a first opening to permit water creatures to enter the trap and to hinder leaving the trap and a second opening for removal of said creatures. The trap has a generally spheroidal configured side surface but with approximately flat top and bottom portions and is ecomonical to construct and easy to operate.

The above and other desired objects, apparent from the drawings and following description, may be attained by the apparatus, construction, arrangements and combinations, subcombinations and parts which comprise the present invention, preferred embodiments of which are illustrative of the mode in which applicant has contemplated applying the principal, being set forth in detail in the following description and illustrated in the accompanying drawings.

SUMMARY OF THE INVENTION

The invention reduces the difficulties and disadvantages of the prior art by providing a collapsible trap which when in the collapsed mode assumes a generally flat symmetrical shape so as to facilitate storage, stacking and transportation and which can be quickly and easily manually unfolded to the erected mode. The collapsible trap according to the invention is characterized by a net and folding frame disposed within and attached to the net. The net has an entrance in the top portion including a first opening to permit water creatures to enter the trap and to hinder leaving the trap. A second opening is provided in the bottom position of the trap for removal of the creatures. The net member is preferably formed of a foldably resilient mesh material having a generally spheroidal side surface with approximately flat top and bottom portions configuration in the erected mode and a relatively flat generally circular configuration in the collapsed mode. The trap is further characterized by a folding frame disposed within the net member and comprises first and second annular members which are attached to the net in spaced parallel relationship. The frame member is further characterized by a plurality of folding longitudinal members joining the first and second annular members together. Each of the longitudinal members comprises a pair of curved arms having distal and proximal ends. Means are provided for pivotally attaching the distal ends of the arms to the annular members and cooperate with other means pivotally attaching the proximal ends of the arms together to thereby permit the longitudinal members to be folded inwardly of the net to collapse the trap and unfolded outwardly to erect the trap. Each longitudinal member is provided with means limiting the outward unfolding movement of the longitudinal members beyond the erected position. In one embodiment of the trap according to the invention means are provided to receive one or more weight members to facilitate submersion of the trap to the desired depth in addition to reducing environmentally induced motion of the trap. Suspension means are provided for the attachment of a suspension cord for lowering and raising the trap into and out of the water. In another embodiment means are provided for attaching large quantities of the trap together to facilitate deployment and recovery during commercial use.

BRIEF DESCRIPTION OF THE DRAWINGS

For a fuller understanding of the nature and desired objects of the invention, reference should be had to the following detailed description taken in connection with the accompanying drawings, wherein like reference characters refer to corresponding parts throughout the several views and wherein:

FIG. 9 is a perspective view of the traps of the present invention deployed for use.

DETAILED DESCRIPTION OF PREFERRED EMBBODIMENT(S)

Figure 1:
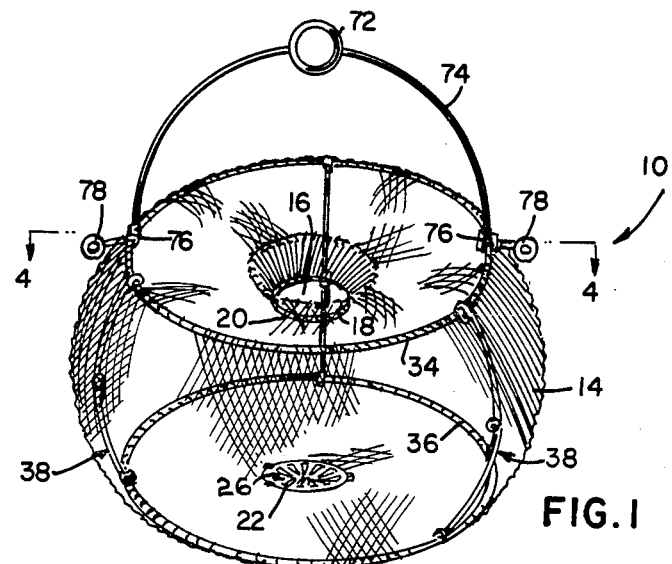
FIG. 1 is a perspective view of a trap in accordance with the invention in an erected mode ready for use.

Referring now to the drawings and more particularly to FIGS. 1-4 there is shown a collapsible marine trap in accordance with the present invention and indicated generally at 10, having a folding frame 12 and a net 14. The net is preferably formed of a wire which is entwinded or woven to form a mesh screen which exhibits resiliency when under the tension forces produced by the folding frame when in the erected mode. One suitable weave is a diagonal cross weave. In the erected mode the net has a generally spheroidal side surface with approximately flat top and bottom portions. The net 14 has an entranceway 16 in the top center portion of the trap 10 and a first opening 18 which terminates with an annular ring member 20. Preferably the opening 18 has a conical or funnel configuration which hinders water creatures from leaving the trap. The net 14 is also provided with a second or access opening 22 in the bottom portion opposite from the entranceway 16 and first opening 18 to provide easy access to the interior of the trap 10 for withdrawal of trapped creatures from the trap. The access opening 22 is defined by annular member 24 which is suitably formed of metal or plastic material. The access opening is provided with a closure member 26 to close the opening 22 when the trap is in use. The closure member 26 is preferably circular in configuration and is attached to annular member 24 by suitable hinge means, such as ring members 28 so that the closure member 26 opens inwardly of the net 16. The closure member 26 can be formed of a suitable plastic material which can be perforated and is provided with common mating friction seal members 30 and 32 to releasably secure the closure member 26 to annular member 24.

The folding frame 12 which is preferably formed of metal such as galvanized metal has a first and second annular members 34 and 36 which are attached to the net 14 in spaced parallel relationship. The annular members 34 and 36 can be attached to the net 14 by forming the members as split metal rings nd inserting them through the mesh structure of the net 12 and thereafter securing the split ends by welding or other suitable means. Other suitable means for attaching the annular members can be employed. For example, a plurality of metallic or plastic rings or ties can be disposed in spaced relationships about annular members and the net material to secure the annular members to the net.

Figure 2:
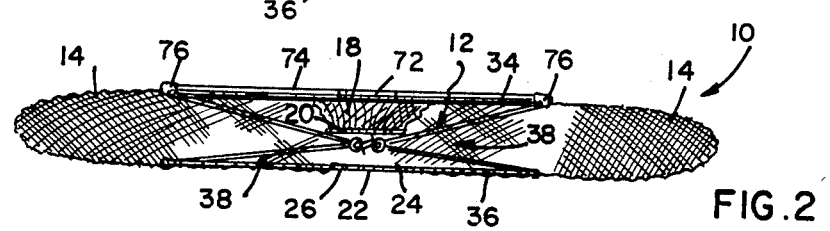
FIG. 2 is a side elevation view of the trap of FIG. 1 shown in the folded or collapsed mode.
Figure 4:
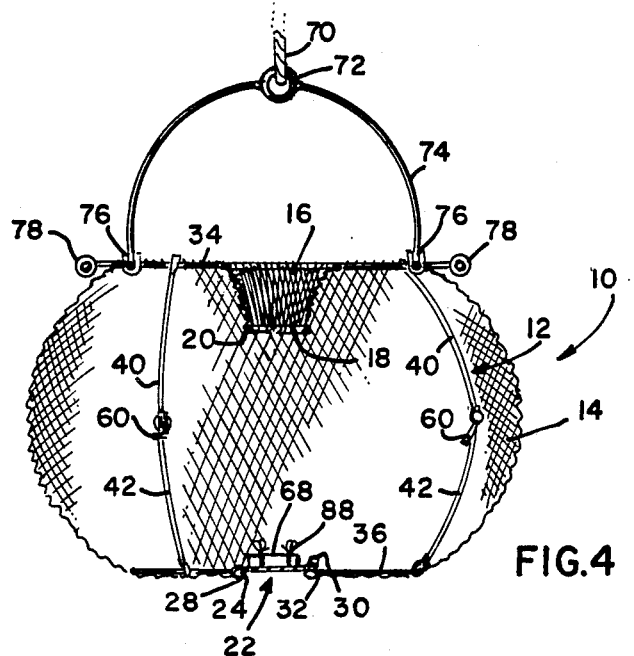
FIG. 4 is a sectional view along the lines of 4—4 of FIG. 1.
Figures 6, 7, 8:
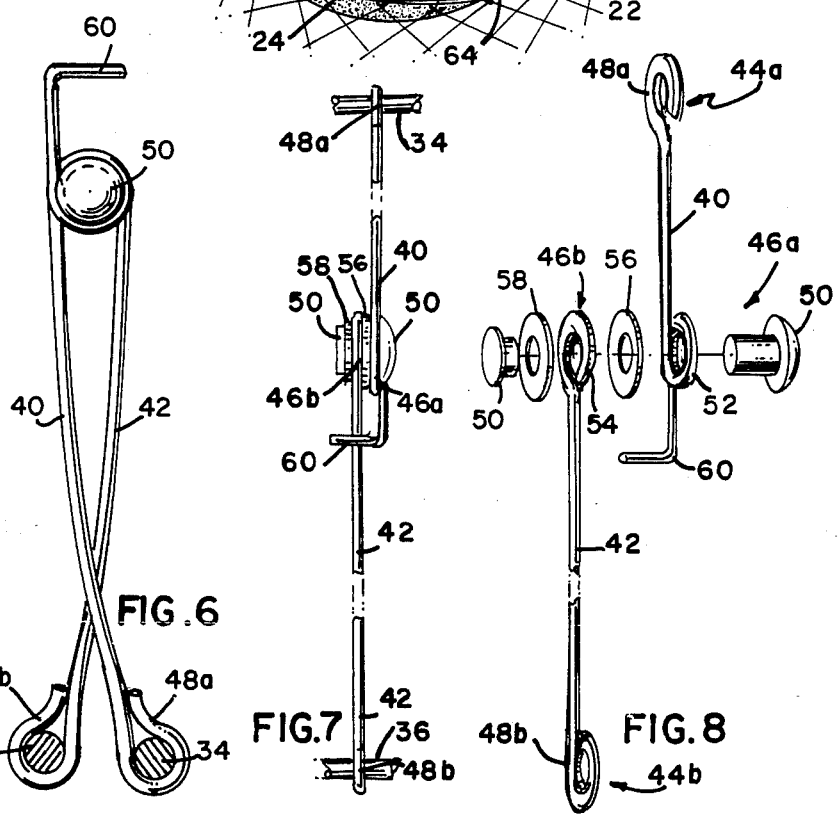
FIG. 6 is a perspective view of a folding longitudinal member of the trap frame shown in a folded or collapsed mode attached to the annular frame members.
FIG. 7 is an elevational view of a folding longitudinal member of the trap frame in an extended mode attached to fragments of the annular frame members.
FIG. 8 is perspective exploded view of a folding longitudinal member of the trap frame and illustating one embodiment of the pivotal attachment of the proximal ends of the arms of the longitudinal member.

The annular members 34 and 36 are joined together by a plurality of folding longitudinal members shown generally at 38. As best seen in FIGS. 4, and 6-8, the folding longitudinal members which are preferably formed of metal such as galvanized metal comprise an upper arm 40 and a lower arm 42. Each of the arms 40 and 42 have distal ends 44a and 44b, and proximal ends 46a and 46b. The distal ends 44a and 44b are pivotally attached to the respective annular members 34 and 36 by suitable means such as the closed loop portions 48a and 48b. The proximal ends 46a and 46b of the arm members 40 and 42 are pivotally attached relative to each other so as to permit the assembly longitudinal members 38 to be folded inwardly of the net to collapse the trap (as best seen in FIGS. 2 and 6) and unfolded outwardly to erect the trap (as best seen in FIGS. 1, 4 and 7). Suitable means for pivotally attaching the proximal ends 46a and 46b (as best seen in FIGS. 7 and 8) comprise a pivot stud or pin 50 upon which the closed loop end members 52 and 54 of the respective proximal ends 46a and 46b pivot. A first locking washer 56 is disposed upon stud 50 between closed loop members 52 and 54, and a second locking washer 58 disposed external to loop end member 46b to releasably lock the arms in the unfolded erected mode. In the embodiment of the invention illustrated, the longitudinal members 38 are provided with means limiting the outward infolding movement of the upper and lower arms from going beyond the vertical position (as best shown in FIGS. 4 and 7). The limitimg means is suitably an elbow member 60 convienently formed by bending the end portion of the proximal end 46a of arm 40 inwardly at a right angle across the vertical plane of the lower arm 42.

Figure 3:
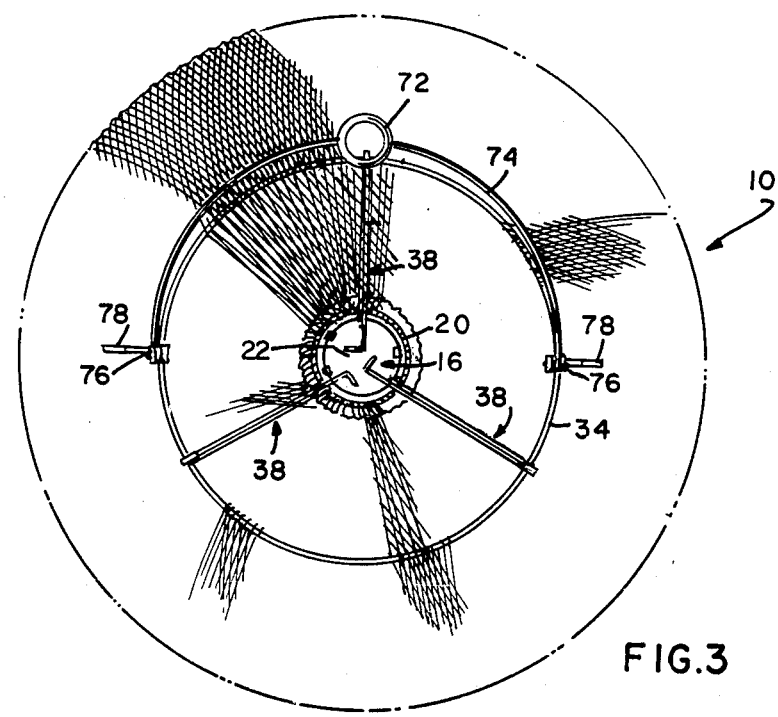
FIG. 3 is a top elevation view of the trap in the collapsed mode of FIG. 2.

Referring now to FIG. 4, it can be seen that the trap 10 is lowered into and raised from the water by a suitable line 70 which is attached to eye 72 of handle member 74. Handle member 74 is attached to the first or upper annular member 34 by suitable hinges 76 which allow the handle 74 to swing to the horizontal position against the top of the trap (see FIG. 3) when the trap is collapsed or when tension on line 70 is released. The arc of the handle member 74 is preferably sufficiently long to permit the handle to clear the entranceway when in the horizontal position as shown in FIGS. 2 and 3. Additionally, the traps are provided with lateral attaching means for joining two or more traps together. Suitable lateral attaching means are shown in rings 78 which are preferably formed of metal and attached to opposite sides of the annular member 34 by suitable means such as welding or hinges well known to those skilled in the art. As illustrated in FIG. 9, when itis desired to deploy large quantities of traps, as in commercial operations, the traps of the present invention can be easily strung or joined together by attaching interconnecting lines 80 and thereafter deploying the traps upon the water bed 84 with the usual floating markers 86 for recovery identification. When the trap is employed in this manner, the handle 74 is preferably omitted, removed, or secured in its horizontal position as shown in FIG. 2. In a preferred embodiment, the trap is provided with one or more removable weight members 68 which are employed to augment the weight of the trap and facilitate descent of the trap to the desired depth in the water as well as to minimize movement of the trap in the water. The weight 68 is provided with holes 60 to receive a line or cord 88 for attaching the weight to the inner surface of the perforated closure member 26.

Figure 5:
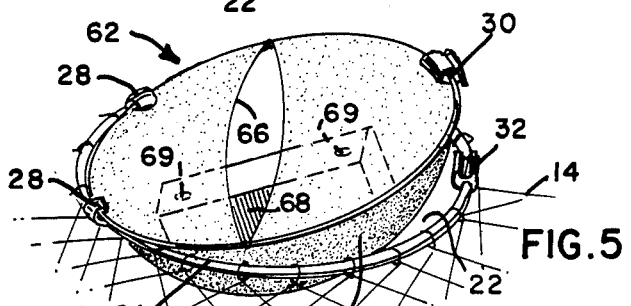
FIG. 5 is a fragmentary perspective view of an alternate embodiment of the closure member associated with the access opening for removal of trapped creatures.

Referring now to FIG. 5 there is illustrated an alternate closure member for the access opening 22. In this embodiment the closure member shown generally at 62 is provided with a flexible pocket 64 having a flexible top access opening 66 to receive and hold one or more weights 68 shown partly by dotted lines. As mentioned previously, the weights can be employed to augment the weight of the trap and facilitate the descent of the trap to the desired depth in the water, and/or to reduce movement of the trap when it is desired to rest the trap upon the water bed or bottom. While the trap frame 12 has been illustrated as having three longitudinal members 38 it is to be understood that additional longitudinal members can be used where for example, due to the weight and size of the trap additional longitudinal members would be desirable. Additionally, while the trap has been described with a generally spheroidal shaped side surface, alternative shapes can be employed with the frame of the present invention, particularly generally spherical or ovate shapes. It has however been found that the spheriodal shape and the oblate spheroidal shape are more suitable for trapping creatures of various sizes for the size of trap constructed in accordance with the present invention. Clearly, in an alternate embodiment, the access opening can be omitted and only the entranceway 16 and opening 18 provided. Such an alternate embodiment might be suitable where the type and size of creature to be trapped could be easily removed through the entranceway.

From the foregoing it is believed apparent that there is provided by the present invention a novel collapsible trap structure which is of simple design and which at the same time, is easy to store and transport in large quantities, and, when set up for use, is strong, durable and lightweight and which, in addition, can be easily and quickly set up or collapsed.

While the invention has been described with respect to preferred embodiments it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

I claim:

1. In a collapsible trap characterized by a net member and a folding frame member, the frame being disposed within the net member and adapted to be erected to form an enclosure therewith, the net member having an entrance including an opening to permit water creatures to enter the trap and to hinder leaving the trap, the improvement comprising:
   the net member being formed of a foldably resilient mesh material and having generally spheroidal configured side surface in the erected mode with approximately flat top and bottom portions and a relatively flat generally circular configuration in the collapsed mode;
   the folding frame being disposed within said net member and comprising:
   first and second annular members attached to said net member in spaced parallel relationship;
   a plurality of curved folding longitudinal members joining said first and second annular members together;
   each of said longitudinal members comprising a pair of arms having distal and proximal ends;
   means pivotally attaching the distal ends of said arms to said annular members; and
   other means pivotally attaching the proximal ends of said arms together to thereby permit said longitudinal members to be folded inwardly of said net to collapse said trap and unfolded outwardly to erect said trap.

2. The collapsible trap of claim 1 further comprising:
   an access opening disposed in the bottom portion of said net member; and
   means for closing said access opening while said trap is in use.

3. A collapsible trap characterized by a net and a folding frame disposed within and attached to the net, the net having an entrance including a first opening to permit water creatures to enter the trap and to hinder leaving the trap and a second opening for removal of said creatures, said trap comprising:
   the net member being formed of a foldably resilient mesh material and having generally spheroidal configured side surface in the erected mode with approximately flat top and bottom portions and a relatively flat generally circular configuration in the collapsed mode;
   the folding frame being disposed within said net member and comprising:
   first and second annular members attached to said net member in spaced parallel relationship;
   a plurality of curved folding longitudinal members joining said first and second annular members together;
   each of said longitudinal members comprising a pair of arms having distal and proximal ends;
   means pivotally attaching the distal ends of said arms to said annular members;
   other means pivotally attaching the proximal ends of said arms together to thereby permit said longitudinal members to be folded inwardly of said net to collapse said trap and unfolded outwardly to erect said trap;
   an inwardly extending entrance disposed in the top portion of said net member;
   an access opening disposed in the bottom portion of said net member; and
   means for closing said access opening while said trap is in use.

4. The collapsible trap of claim 3 further comprising means associated with said longitudinal members for limiting the outward unfolding of said longitudinal members beyond the erected position.

5. The collapsible trap of claim 3 further comprising means engaging said first annular member to permit the trap to be raised and lowered and adapted to be folded adjacent said annular member when not in use.

6. The collapsible trap of claim 3 further comprising means adapted to releasably hold weight members to thereby facilitate descent of said trap to the desired depth of water.

7. The collapsible trap of claim 3 wherein the mesh size of said net is sufficient to permit said first and second annular members to pass therethrough in a woven manner to thereby attach said first and second annular members to said net in spaced parallel relationship.

8. The collapsible trap of claim 3 further comprising means attached to said trap for joining a plurality of said traps together to permit deployment and recovery of said traps as a group.

9. The collapsible trap of claim 3 further comprising weight means attached to said means for closing said access opening.

10. The collapsible trap of claim 3 wherein said net member is formed of diagonally cross woven wired members.

* * * * *